(12) United States Patent
Janssen (10) Patent No.: US 6,935,586 B1
(45) Date of Patent: Aug. 30, 2005

(54) RECYCLING DEVICE AND METHOD

(76) Inventor: Robert J. Janssen, 37 Greenhill Ave, Hamilton, ON (CA) L8K 5C5

(\*) Notice: Subject to any disclaimer, the term of this patent is extended or adjusted under 35 U.S.C. 154(b) by 136 days.

(21) Appl. No.: 10/646,045

(22) Filed: Aug. 22, 2003

(51) Int. Cl.[7] .......................... B02B 5/02; B02C 1/10; B02C 19/00; B02C 9/04; B03B 7/00
(52) U.S. Cl. .................. 241/101.2; 241/99; 241/236; 100/94; 100/102
(58) Field of Search .............................. 241/99, 101.2, 241/236; 100/102, 214, 215, 229 A (56) References Cited

U.S. PATENT DOCUMENTS

| | | | | |
|---|---|---|---|---|
| 4,102,263 A | * | 7/1978 | Forsberg ...................... 100/74 |
| 5,123,341 A | * | 6/1992 | Carter et al. ................ 100/223 |
| 5,257,577 A | * | 11/1993 | Clark .......................... 100/99 |
| 5,259,304 A | * | 11/1993 | Roberts ....................... 100/99 |
| 5,425,458 A | * | 6/1995 | Gilcreest et al. ............ 209/655 |
| 5,447,017 A | * | 9/1995 | Becher et al. ................ 53/527 |
| 5,813,323 A | * | 9/1998 | Nowak ......................... 100/52 |

\* cited by examiner

*Primary Examiner*—Derris H. Banks
*Assistant Examiner*—Jason Y Pahng (57) ABSTRACT

A recycling device and a method of using same are disclosed. The recycling device includes the interconnected components of a housing unit, a first door, a second door, an elongated barrel, an electrical plug, a utility motor, a utility belt drive, a rolling pin, a conveyor belt, a plurality of intake rollers, a shredding blade, a receiving bucket, a hydraulic press, a compression piston, and a control panel. The method of using the device includes a convenient means for recycling a plurality of various types of materials, in which the method includes the steps of obtaining and plugging.

12 Claims, 4 Drawing Sheets

RECYCLING DEVICE AND METHOD

FIELD OF THE INVENTION

The invention relates to the disposal and storage of used materials, specifically a device for separating and treating recyclable materials from a single location, and providing for the collection thereof.

DESCRIPTION OF THE PRIOR ART

The popularity of recycling has become a necessity as the consumption of disposable containers is on the increase. In addition to the shrinkage of landfill space, landscape destruction associated with the extraction and processing of raw materials is a more recent ecological concern as is the economic inefficiency of such processes, in contrast to the processing of used containers. However, alarming amounts of reusable materials are still being discarded by the millions daily. One common reason for this sad statistic is that individuals find recycling inconvenient.

A wide variety of recycling is currently available on the commercial market and an even larger number of these types of devices are known in the art of recycling, for example, the solid waste compactor with multiple receptacles disclosed by Carter et al. in U.S. Pat. No. 5,123,341; the apparatus for assist in recycling of refuse disclosed by Clark in U.S. Pat. No. 5,257,577; the carousel compactor for multi-component refuse disclosed by Roberts in U.S. Pat. No. 5,259,304; the device for separation and storage of recyclable materials disclosed by Gilcreest et al. in U.S. Pat. No. 5,425,458; the automatic waste recycling machine and disposal system disclosed yb Becher et al. in U.S. Pat. No. 5,447,017; the multiple-bin waste compactor disclosed by Nowak in U.S. Pat. No. 5,813,323; and the recycling bin disclosed by Olivetti in U.S. Pat. No. D428,229.

While all of the above-described devices fulfill their respective, particular objectives and requirements, the aforementioned patents do not describe a recycling device having the interconnected components of a housing unit, a first door, a second door, an elongated barrel, an electrical plug, a utility motor, a utility belt drive, a rolling pin, a conveyor belt, a plurality of intake rollers, a shredding blade, a receiving bucket, a hydraulic press, a compression piston, and a control panel. This combination of elements would specifically match the user's particular individual needs of making it possible to use the device as a convenient means for recycling various types of materials, such as, paper, glass, and plastic. The above-described patents make no provision for a recycling device having the interconnected components of a housing unit, a first door, a second door, an elongated barrel, an electrical plug, a utility motor, a utility belt drive, a rolling pin, a conveyor belt, a plurality of intake rollers, a shredding blade, a receiving bucket, a hydraulic press, a compression piston, and a control panel.

Therefore, a need exists for a new and improved recycling device having the interconnected components of a housing unit, a first door, a second door, an elongated barrel, an electrical plug, a utility motor, a utility belt drive, a rolling pin, a conveyor belt, a plurality of intake rollers, a shredding blade, a receiving bucket, a hydraulic press, a compression piston, and a control panel. In this respect, the recycling device according to the present invention substantially departs from the conventional concepts and designs of the prior art, and in doing so provides an apparatus primarily developed for the purpose of providing a convenient means for recycling various types of materials, such as, paper, glass, and plastic.

SUMMARY OF THE INVENTION

The present device and the method of using, according to the principles of the present invention, overcomes the shortcomings of the prior art by providing a unique and nonobvious variation of a recycling device and a method of using same. The recycling device includes the interconnected components of a housing unit, a first door, a second door, an elongated barrel, an electrical plug, a utility motor, a utility belt drive, a rolling pin, a conveyor belt, a plurality of intake rollers, a shredding blade, a receiving bucket, a hydraulic press, a compression piston, and a control panel. The method includes the steps of obtaining and plugging.

In view of the foregoing disadvantages inherent in the known type recycling devices now present in the prior art, the present invention provides an improved recycling device, which will be described subsequently in great detail, is to provide a new and improved recycling device which is not anticipated, rendered obvious, suggested, or even implied by the prior art, either alone or in any combination thereof.

To attain this, the present invention essentially comprises a recycling device having the interconnected components of a housing unit, a first door, a second door, an elongated barrel, an electrical plug, a utility motor, a utility belt drive, a rolling pin, a conveyor belt, a plurality of intake rollers, a shredding blade, a receiving bucket, a hydraulic press, a compression piston, and a control panel.

There has thus been outlined, rather broadly, the more important features of the invention in order that the detailed description thereof that follows may be better understood, and in order that the present contribution of the art may be better appreciated.

The invention may also include a first handle. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved recycling device that has all the advantages of the prior art recycling device and none of the disadvantages.

It is another object of the present invention to provide a new and improved recycling device that may be easily and efficiently manufactured and marketed.

An even further object of the present invention is to provide a new and improved recycling device that has a low cost of manufacture with regard to both materials and labor, and which accordingly is then susceptible of low prices of sale to the consuming public, thereby making such multipurpose storage unit and system economically available to the buying public.

Still another object of the present invention is to provide a new recycling device that provides in the apparatuses and methods of the prior art some of the advantages thererof, while simultaneously overcoming some of the disadvantages normally associated therewith.

Even still another object of the present invention is to provide a recycling device having the interconnected components of a housing unit, a first door, a second door, an elongated barrel, an electrical plug, a utility motor, a utility belt drive, a rolling pin, a conveyor belt, a plurality of intake rollers, a shredding blade, a receiving bucket, a hydraulic press, a compression piston, and a control panel. This combination of elements makes it possible to use the device as a convenient means for recycling various types of materials, such as, paper, glass, and plastic.

Lastly, it is an object of the present invention to provide a new and improved method of using comprising the steps of obtaining and plugging.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and description matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description males reference to the annexed drawings wherein.

The same reference numerals refer to the same parts throughout the various figures.

DETAILED DESCRIPTION OF THE PREFERRED EMBODIMENT

Figure 1:
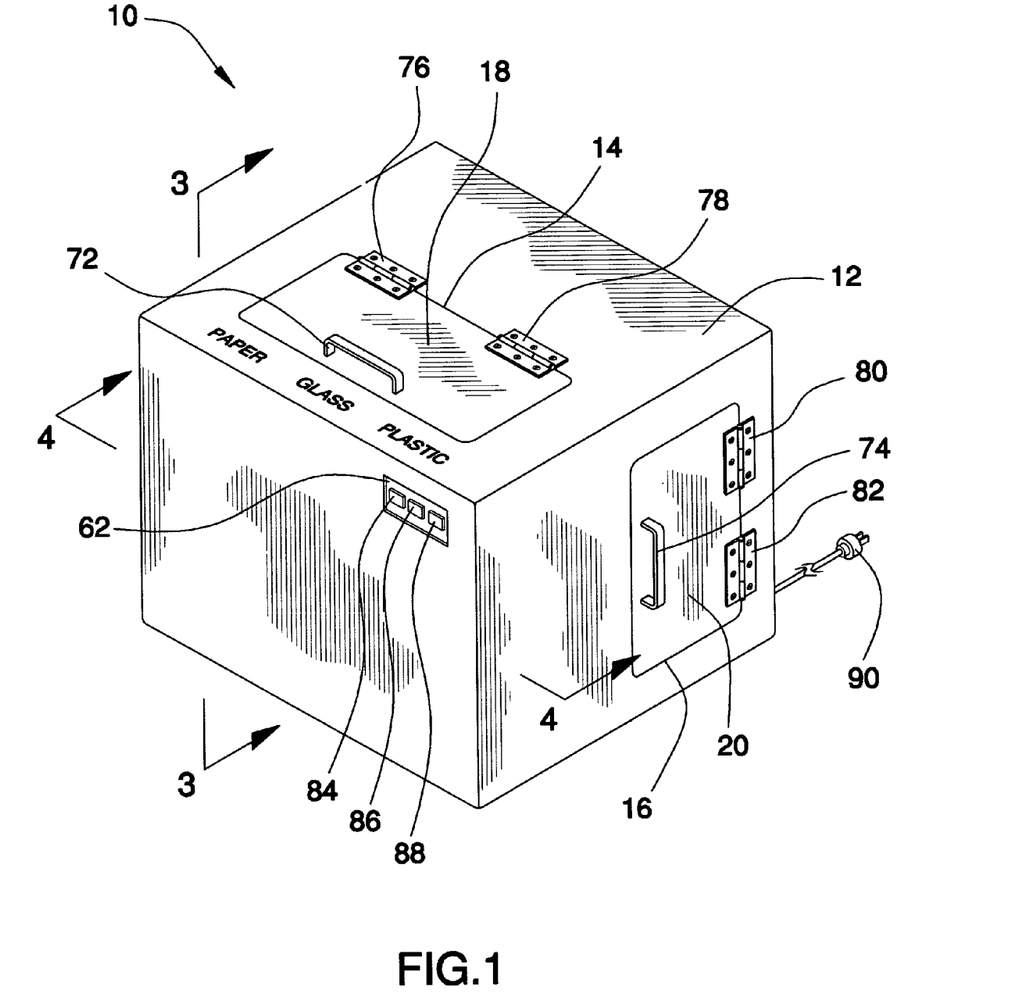
FIG. 1 is a perspective view of an preferred embodiment of the recycling device constructed in accordance with the principles of the present invention.
Figure 2:
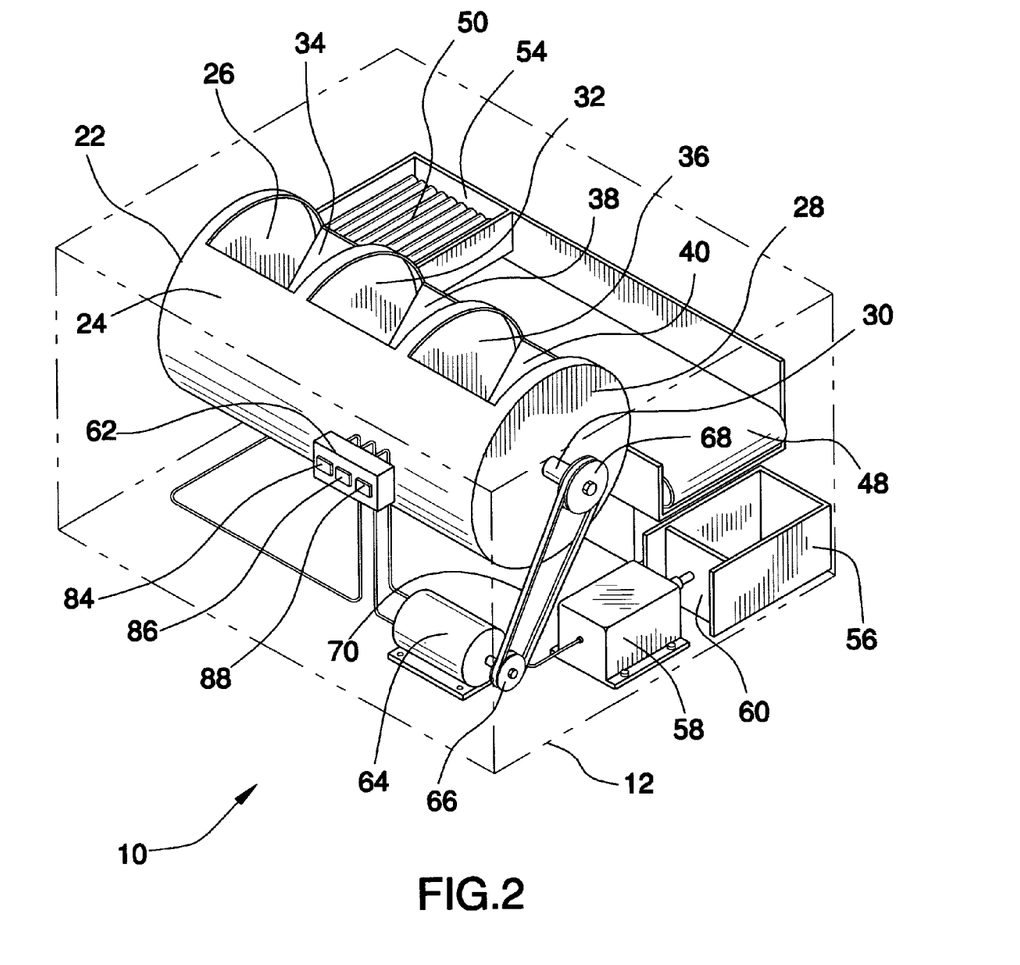
FIG. 2 is a transparent perspective view of a preferred embodiment of the recycling device of the present invention.
Figure 3:
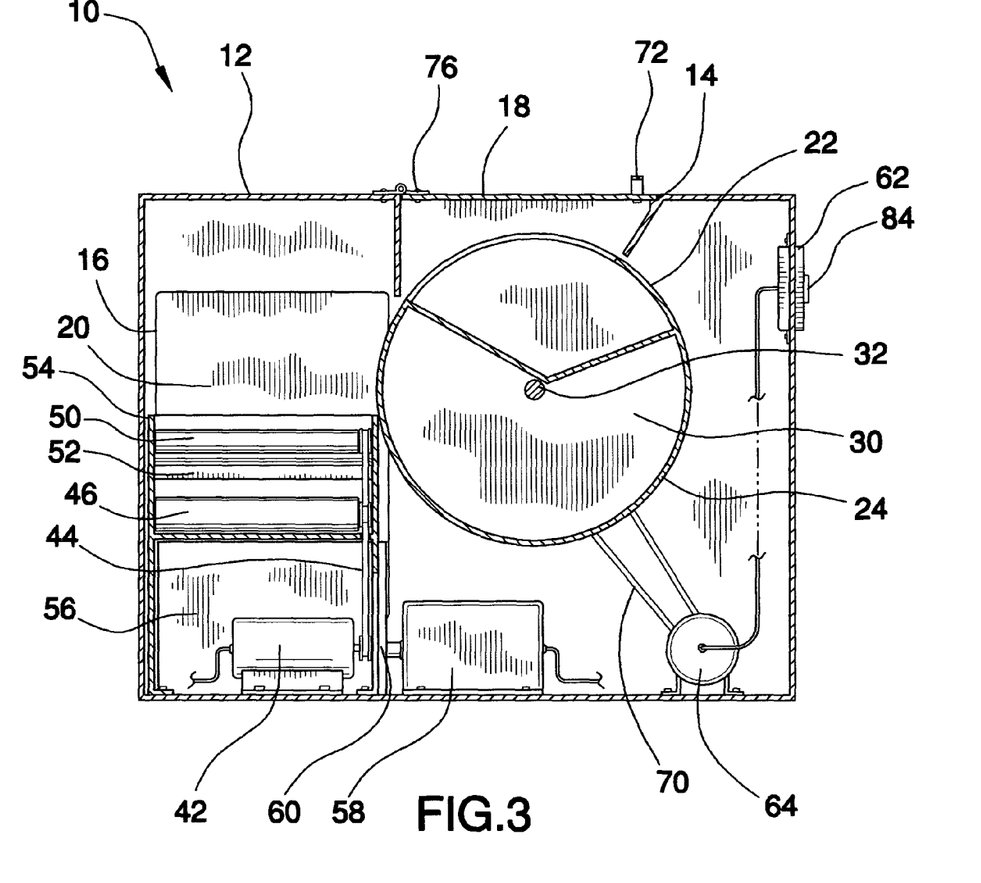
FIG. 3 is a cross sectional side view of a preferred embodiment of the recycling device of the present invention.
Figure 4:
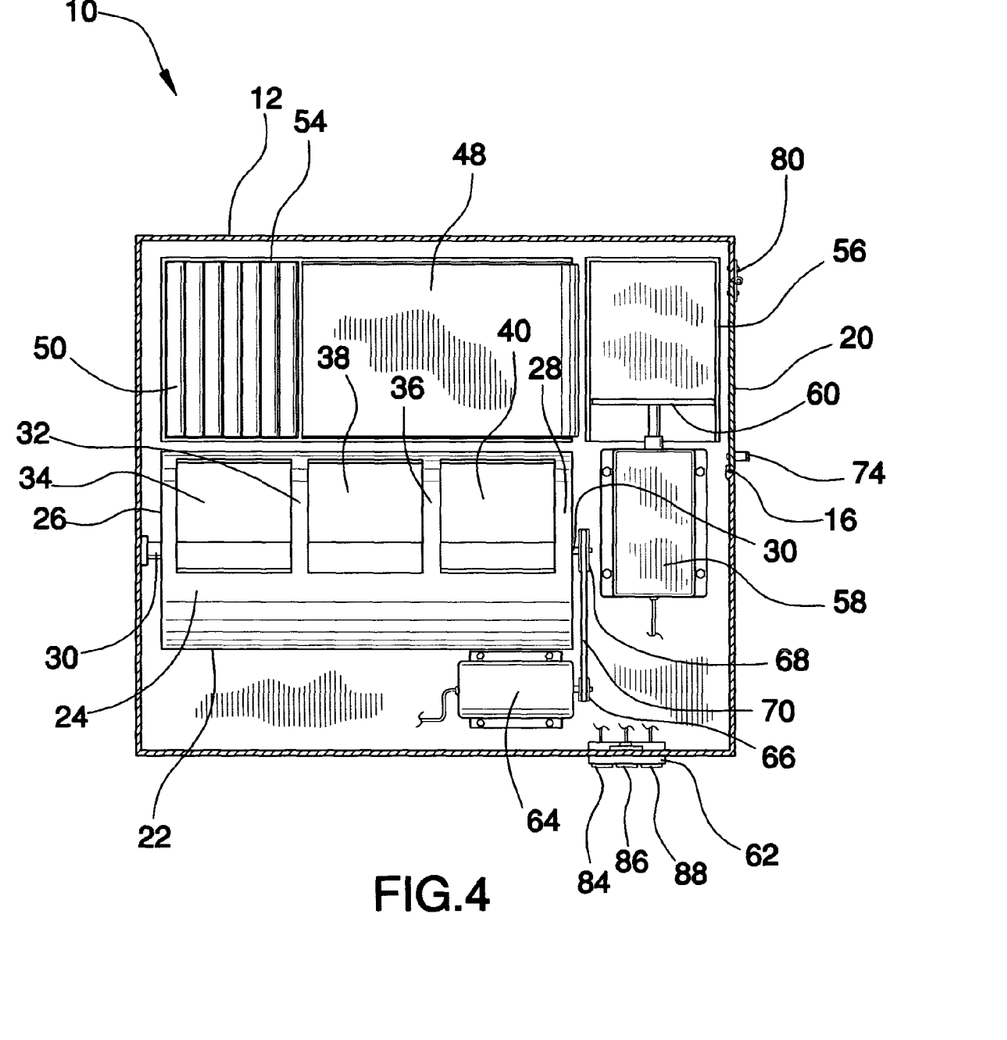
FIG. 4 is a cross sectional top view of a preferred embodiment of the recycling device of the present invention.

Referring now to the drawings, and in particular FIGS. 1 to 4 thereof, one preferred embodiment of the present invention is shown and generally designated by the reference numeral 10. One preferred embodiment of a recycling device 10 comprises a housing unit 12, a first door 18, a second door 20, an elongated barrel 22, an electrical plug 90, a utility motor 42, a utility belt drive 44, a rolling pin 46, a conveyor belt 48, a plurality of intake rollers 50, a shredding blade 52, a paper shredder 54, a receiving bucket 56, a hydraulic press 58, a compression piston 60, and a control panel 62. The housing unit 12 has an interior chamber, a first collar 14 defining a top orifice in the housing unit 12 and a second collar 16 defining a side orifice in the housing unit 12, wherein the top and side orifices are capable of allowing access into the interior chamber of the housing unit 12. The first door 18 is pivotally attached to the housing unit 12, wherein the first door 18 is capable of covering a portion of the top orifice of the housing unit 12. The second door 20 is pivotally attached to the housing unit 12, wherein the second door 20 capable of covering a portion of the side orifice of the housing unit 12. The elongated barrel 22 having a central axis, in which the barrel 22 is rotatably attached to the housing unit 12, wherein the barrel 22 is disposed within the interior chamber of the housing unit 12. The barrel 22 comprises an exterior casing 24, a distal wall 26, a center shaft 30, a first partition wall 32, and a second partition wall 36. The distal wall 26 is attached to the exterior casing 24. The proximate wall 28 is attached to the exterior casing 24. The center shaft 30 is attached to the distal wall 26 and is attached to the proximate wall 28, wherein the center shaft 30 is disposed substantially along the central axis of the barrel 22, in which the center shaft 30 pivotally attached to the housing unit 12. The first partition wall 32 is attached to the exterior casing 24 of the barrel 22, wherein the barrel 22 has a first receiving bin 34 defined by the distal wall 26, the first partition wall 32, and the exterior casing 24. The second partition wall 36 is attached to the exterior casing 24 of the barrel 22, wherein the barrel 22 has a second receiving bin 38 defined by the first partition wall 32, the second partition wall 36 and the exterior casing 24, wherein the barrel 22 having a third receiving bin 40 defined by the second partition wall 36, the proximate wall 28, and the exterior casing 24. The electrical plug 90 is attached to the housing unit 12. The utility motor 42 is attached to the housing unit 12, and the utility motor 42 is operatively attached to the electrical plug 90. The utility belt drive 44 is operatively attached to the utility motor 42. The rolling pin 46 is pivotally attached to the housing unit 12, wherein the rolling pin 46 is operatively attached to the utility belt drive 44. The conveyor belt 48 is operatively attached to the rolling pin 46. The plurality of intake rollers 50 is pivotally attached to the housing unit 12, wherein the plurality of intake rollers 50 is operatively attached to the utility belt drive 44. The shredding blade 52 is attached to the housing unit 12, wherein the plurality of intake rollers 50 and the shredding blade 52 defining a paper shredder 54. The receiving bucket 56 is attached to the housing unit 12. The hydraulic press 58 is attached to the housing unit 12, and the hydraulic press 58 is operatively attached to the electrical plug 90. The compression piston 60 is attached to the hydraulic press 58, wherein a portion of the compression piston 60 is slidably insertable within a portion of the receiving bucket 56. The control panel 62 is attached to the housing unit 12, so that the control panel 62 is operatively connected to the utility motor 42 and to the hydraulic press 58.

An optional means for automatically rotating the barrel may be added to the device 10. The optional means for automatically rotating the barrel comprises an electric motor 64, a first pulley 66, a second pulley 68, and a flexible band 70. The electric motor 64 is attached to the housing unit 12, in which the electric motor 64 is operatively attached to the control panel 62 and operatively attached to the electrical plug 90. The first pulley 66 is attached to the electric motor 64. The second pulley 68 is attached to the center shaft 30 of the barrel 22. The flexible band 70 is operatively attached to the first pulley 66 and to the second pulley 68.

An optional first handle 72 may be added to the device 10 in which the first handle 72 is attached to the first door 18.

An optional second handle 74 may be added to the device 10 in which the second handle 74 is attached to the second door 20.

An optional first hinge 76 may be added to the device 10 in which the first hinge 76 is attached to the housing unit 12 and attached to the first door 18.

An optional second hinge 78 may be added to the device 10 in which the second hinge 78 is attached to the housing unit 12 and attached to the first door 18.

An optional third hinge 80 may be added to the device 10 in which the third hinge 80 is attached to the housing unit 12 and attached to the second door 20.

An optional a fourth hinge 82 may be added to the device 10 in which the fourth hinge 82 is attached to the housing unit 12 and attached to the second door 20.

The control panel 62 may have a first button 84 operatively attached to the utility motor 42; a second button 86 operatively attached to the hydraulic press 58; and a third button 88 operatively attached to the electric motor 64.

Another preferred embodiment of the recycling device 10 consisting essentially of: a housing unit 12 having an interior chamber, a first collar 14 defining a top orifice in the housing unit 12 and a second collar 16 defining a side orifice in the housing unit 12, wherein the top and side orifices are capable of allowing access into the interior chamber of the housing unit 12; a first door 18 pivotally attached to the housing unit 12, the first door 18 capable of covering a portion of the top orifice of the housing unit 12; a second door 20 pivotally attached to the housing unit 12, the second door 20 capable of covering a portion of the side orifice of the housing unit 12; an elongated barrel 22 having a central axis, the barrel 22 rotatably attached to the housing unit 12, the barrel 22 disposed within the interior chamber of the housing unit 12, the barrel 22 comprising: an exterior casing 24; a distal wall 26 attached to the exterior casing 24; a proximate wall 28 attached to the exterior casing 24; a center shaft 30 attached to the distal wall 26 and attached to the proximate wall 28, the center shaft 30 disposed substantially along the central axis of the barrel 22, wherein the center shaft 30 pivotally attached to the housing unit 12; a first partition wall 32 attached to the exterior casing 24 of the barrel 22, wherein the barrel 22 having a first receiving bin 34 defined by the distal wall 26, the first partition wall 32, and the exterior casing 24; and a second partition wall 36 attached to the exterior casing 24 of the barrel 22, wherein the barrel 22 having a second receiving bin 38 defined by the first partition wall 32, the second partition wall 36 and the exterior casing 24, wherein the barrel 22 having a third receiving bin 40 defined by the second partition wall 36, the proximate wall 28, and the exterior casing 24; an electrical plug 90 attached to the housing unit 12; a utility motor 42 attached to the housing unit 12, the utility motor 42 operatively attached to the electrical plug 90; a utility belt drive 44 operatively attached to the utility motor 42; a rolling pin 46 pivotally attached to the housing unit 12, the rolling pin 46 operatively attached to the utility belt drive 44; a conveyor belt 48 operatively attached to the rolling pin 46; a plurality of intake rollers 50 pivotally attached to the housing unit 12, wherein the plurality of intake rollers 50 operatively attached to the utility belt drive 44; a shredding blade 52 attached to the housing unit 12, wherein the plurality of intake rollers 50 and the shredding blade 52 defining a paper shredder 54; a receiving bucket 56 attached to the housing unit 12; a hydraulic press 58 attached to the housing unit 12, the hydraulic press 58 operatively attached to the electrical plug 90; a compression piston 60 attached to the hydraulic press 58, a portion of the compression piston 60 is slidably insertable within a portion of the receiving bucket 56; an electric motor 64 attached to the housing unit 12, the electric motor 64 operatively attached to the electrical plug 90; a control panel 62 attached to the housing unit 12, the control panel 62 is operatively connected to the utility motor 42, to the hydraulic press 58 and to the electric motor 64, wherein the control panel 62 having a first button 84 operatively attached to the utility motor 42; a second button 86 operatively attached to the hydraulic press 58; and a third button 88 operatively attached to the electric motor 64; a first pulley 66 attached to the electric motor 64; a second pulley 68 attached to the center shaft 30 of the barrel 22; a flexible band 70 operatively attached to the first pulley 66 and to the second pulley 68; a first handle 72 attached to the first door 18; a second handle 74 attached to the second door 20; a first hinge 76 attached to the housing unit 12 and attached to the first door 18; a second hinge 78 attached to the housing unit 12 and attached to the first door 18; a third hinge 80 attached to the housing unit 12 and attached to the second door 20; and a fourth hinge 82 attached to the housing unit 12 and attached to the second door 20.

One preferred embodiment of a method of using a recycling device 10, the method comprising the steps of: obtaining and plugging. The obtaining step comprises obtaining the device 10 comprising: a housing unit 12 having an interior chamber, a first collar 14 defining a top orifice in the housing unit 12 and a second collar 16 defining a side orifice in the housing unit 12, wherein the top and side orifices are capable of allowing access into the interior chamber of the housing unit 12; a first door 18 pivotally attached to the housing unit 12, the first door 18 capable of covering a portion of the top orifice of the housing unit 12; a second door 20 pivotally attached to the housing unit 12, the second door 20 capable of covering a portion of the side orifice of the housing unit 12; an elongated barrel 22 having a central axis, the barrel 22 rotatably attached to the housing unit 12, the barrel 22 disposed within the interior chamber of the housing unit 12, the barrel 22 comprising: an exterior casing 24; a distal wall 26 attached to the exterior casing 24; a proximate wall 28 attached to the exterior casing 24; a center shaft 30 attached to the distal wall 26 and attached to the proximate wall 28, the center shaft 30 disposed substantially along the central axis of the barrel 22, wherein the center shaft 30 pivotally attached to the housing unit 12; a first partition wall 32 attached to the exterior casing 24 of the barrel 22, wherein the barrel 22 having a first receiving bin 34 defined by the distal wall 26, the first partition wall 32, and the exterior casing 24; and a second partition wall 36 attached to the exterior casing 24 of the barrel 22, wherein the barrel 22 having a second receiving bin 38 defined by the first partition wall 32, the second partition wall 36 and the exterior casing 24, wherein the barrel 22 having a third receiving bin 40 defined by the second partition wall 36, the proximate wall 28, and the exterior casing 24; an electrical plug 90 attached to the housing unit 12; a utility motor 42 attached to the housing unit 12, the utility motor 42 operatively attached to the electrical plug 90; a utility belt drive 44 operatively attached to the utility motor 42; a rolling pin 46 pivotally attached to the housing unit 12, the rolling pin 46 operatively attached to the utility belt drive 44; a conveyor belt 48 operatively attached to the rolling pin 46; a plurality of intake rollers 50 pivotally attached to the housing unit 12, wherein the plurality of intake rollers 50 operatively attached to the utility belt drive 44; a shredding blade 52 attached to the housing unit 12, wherein the plurality of intake rollers 50 and the shredding blade 52 defining a paper shredder 54; a receiving bucket 56 attached to the housing unit 12; a hydraulic press 58 attached to the housing emit 12, the hydraulic press 58 operatively attached to the electrical plug 90; a compression piston 60 attached to the hydraulic press 58, a portion of the compression piston 60 is slidably insertable within a portion of the receiving bucket 56; an electric motor 64 attached to the housing unit 12, the electric motor 64 operatively attached to the electrical plug 90; a control panel 62 attached to the housing unit 12, the control panel 62 is operatively connected to the utility motor 42, to the hydraulic press 58 and to the electric motor 64, wherein the control panel 62 having: a first button 84 operatively attached to the utility motor 42; a second button 86 operatively attached to the hydraulic press 58; and a third button 88 operatively attached to the electric motor 64; a first pulley 66 attached to the electric motor 64; a second pulley 68 attached to the center shaft 30 of the barrel 22; a flexible band 70 operatively attached to the first pulley 66 and to the second pulley 68; a first handle 72 attached to the first door 18; a second handle 74 attached to the second door 20; a first hinge 76 attached to the housing unit 12 and attached to the first door 18; a second hinge 78 attached to the housing unit 12 and attached to the first door 18; a third hinge 80 attached to the housing unit 12 and attached to the second door 20; and a fourth hinge 82 attached to the housing unit 12 and attached to the second door 20. The plugging step comprises plugging the electrical plug 90 into an electrical power socket.

An optional additional set of steps may be added to the method further comprising the steps of: closing, depressing, grabbing, gripping, opening, placing, pressing, pushing, reaching, removing, and slinging. The grabbing step comprises grabbing hold of the first handle 72 attached to the first door 18. The opening step comprises opening pivotally the first door 18 while grabbing hold of the first handle 72. The placing step comprises placing a bunch of paper into the first receiving bin 34 of the barrel 22 when the first door 18 is opened. The closing step comprises closing pivotally the first door 18. The pressing step comprises pressing on the third button 88 of the control panel 62 to activate the electric motor 64 to operatively dump the bunch of paper in the first receiving bin 34 onto the plurality of intake rollers 50 of the paper shredder 54. The depressing step comprises depressing on the first button 84 of the control panel 62 to activate the utility motor 42 to operatively drive the plurality of intake rollers 50 to force the bunch of paper into the shredding blade 52 so that the bunch of paper is transformed in to shredded paper dropped onto the conveyor belt 48 and to operatively drive the conveyor belt 48 to move the shredded paper into the receiving bucket 56. The pushing step comprises pushing on the second button 86 of the control panel 62 to activate the hydraulic press 58 to compress the shredded paper into a compressed paper packet by operatively enabling the compression piston 60 to be slidably inserted within the receiving bucket 56. The gripping step comprises gripping onto the second handle 74 attached to the second door 20. The slinging step comprises slinging open the second door 20 while gripping onto the second handle 74. The reaching step comprises reaching into the receiving bucket 56. The removing step comprises removing the compressed paper packet from the receiving bucket 56.

Still another additional set of steps may be added to the method further comprising the steps of: affixing and putting. The putting step comprises putting the compressed paper packet in a bag. The affixing step comprises affixing a bar code label onto the bag, wherein the bar code label capable of indicating a material content contained within the bag and indicating a customer identification.

Yet another additional set of steps may be added to the method further comprising the steps of: activating, enabling, grasping, holding, pivoting, pouring, powering, and rotating. The grasping step comprises grasping onto the first handle 72 of the first door 18. The pivoting step comprises pivoting open the first door 18 while grasping onto the door. The pouring step comprises pouring a group of glass bottles into the second receiving bin 38 of the barrel 22 while the first door 18 is pivoted open. The activating step comprises activating the electric motor 64 to rotate the barrel 22 so that the group of glass bottles fall from the second receiving bin 38 onto the conveyor belt 48. The enabling step comprises enabling the utility motor 42 to transport the group of glass bottles from the conveyor belt 48 to the receiving bucket 56. The powering step comprises powering up the hydraulic press 58 to compress the group of glass bottles into a group of glass shards by using the second button 86 of the control panel 62. The holding step comprises holding onto the second handle 74 of the second door 20. The rotating step comprises rotating open the second door 20 while holding onto the second handle 74 of the second door 20.

Still yet another additional set of steps may be added to the method further comprising the steps: adhering and collecting. The collecting step comprises collecting the group of glass shards into a cardboard box. The adhering step comprises adhering a label onto the box, wherein the label indicating the group of glass shards in the cardboard box and indicating the a user identification.

Even yet another additional set of steps may be added to the method further comprising the steps of: allowing, catching, empowering, and energizing. The catching step comprises catching hold of the first handle 72 of the first door 18. The swinging step comprises swinging open the first door 18 while catching hold of the first door 18. The pouring step comprises pouring a plurality of plastic items into the third receiving bin 40 of the barrel 22. The energizing step comprises energizing the electric motor 64 to rotate the barrel 22 so that the plurality of plastic items drop from the third receiving bin 40 onto the conveyor belt 48 by using the third button 88 on the control panel 62. The empowering step comprises empowering the utility motor 42 to make the conveyor belt 48 transport the plurality of plastic items from the conveyor belt 48 into the receiving bucket 56 by using the first button 84 on the control panel 62. The allowing step comprises allowing the hydraulic press 58 to compress the plurality of plastic items in the receiving bucket 56 into a compressed plastic mass.

Still yet another additional set of steps may be added to the method further comprising the steps of: getting, glueing, inserting, snatching, and swinging. The snatching step comprises snatching hold the second handle 74 of the second door 20 with a hand. The swinging step comprises swinging open the second door 20 while snatching hold of the second handle 74. The getting step comprises getting the compressed plastic mass out of the receiving bucket 56. The inserting step comprises inserting the compressed plastic mass into a sack. The glueing step comprises glueing a sticker onto the sack, wherein the sticker is capable of identifying the compressed plastic mass in the sack, and in identifying an address.

Another preferred embodiment of the method comprises the steps of: activating, adhering, affixing, allowing, catching, closing, collecting, depressing, empowering, enabling, energizing, getting, glueing, grabbing, grasping, gripping, holding, inserting, obtaining, opening, pivoting, placing, plugging, pouring, powering, pressing, pushing, putting, reaching, removing, rotating, slinging, snatching, and swinging.

As to the manner of usage and operation of the present invention, the same should be apparent from the above description. Accordingly, no further discussion relating to the manner of usage and operation will be provided.

While a preferred embodiment of the recycling device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes" or variations, thereof, or the term "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A recycling device comprising:
   a unit housing having an interior chamber, a first collar defining a top orifice in said housing unit and a second collar defining a side orifice in said housing unit, wherein said top and side orifices are capable of allowing access into the interior chamber of said housing unit;
   a first door pivotally attached to said housing unit, said first door capable of covering a portion of the top orifice of said housing unit;
   a second door pivotally attached to said housing unit, said second door capable of covering a portion of the side orifice of said housing unit;
   an elongated barrel having a central axis, said barrel rotatably attached to said housing unit, said barrel disposed within the interior chamber of said housing unit, said barrel comprising:
   an exterior casing;
   a distal wall attached to said exterior casing;
   a proximate wall attached to said exterior casing;
   a center shaft attached to said distal wall and attached to said proximate wall, said center shaft disposed substantially along the central axis of said barrel, wherein said center shaft pivotally attached to said housing unit;
   a first partition wall attached to said exterior casing of said barrel, wherein said barrel having a first receiving bin defined by said distal wall, said first partition wall, and said exterior casing; and
   a second partition wall attached to said exterior casing of said barrel, wherein said barrel having a second receiving bin defined by said first partition wall, said second partition wall and said exterior casing, wherein said barrel having a third receiving bin defined by said second partition wall, said proximate wall, and said exterior casing;
   an electrical plug attached to said housing unit;
   a utility motor attached to said housing unit, said utility motor operatively attached to said electrical plug;
   a utility belt drive operatively attached to said utility motor;
   a rolling pin pivotally attached to said housing unit, said rolling pin operatively attached to said utility belt drive;
   a conveyor belt operatively attached to said rolling pin;
   a plurality of intake rollers pivotally attached to said housing unit, wherein said plurality of intake rollers operatively attached to said utility belt drive;
   a shredding blade attached to said housing unit, wherein said plurality of intake rollers and said shredding blade defining a paper shredder;
   a receiving bucket attached to said housing unit;
   a hydraulic press attached to said housing unit, said hydraulic press operatively attached to said electrical plug;
   a compression piston attached to said hydraulic press, a portion of said compression piston is slidably insertable within a portion of said receiving bucket; and
   a control panel attached to said housing unit, said control panel is operatively connected to said utility motor and to said hydraulic press.

2. The device of claim 1 further comprising:
   an electric motor attached to said housing unit, said electric motor operatively attached to said control panel and operatively attached to said electrical plug;
   a first pulley attached to said electric motor;
   a second pulley attached to said center shaft of said barrel; and a flexible band operatively attached to said first pulley and to said second pulley.

3. The device of claim 1 further comprising a first handle attached to said first door.

4. The device of claim 1 further comprising a second handle attached to said second door.

5. The device of claim 1 further comprising a first hinge attached to said housing unit and attached to said first door.

6. The device of claim 5 further comprising a second hinge attached to said housing unit and attached to said first door.

7. The device of claim 1 further comprising a third hinge attached to said housing unit and attached to said second door.

8. The device of claim 7 further comprising a fourth hinge attached to said housing unit and attached to said second door.

9. The device of claim 1 wherein said control panel having a first button operatively attached to said utility motor.

10. The device of claim 1 wherein said control panel having a second button operatively attached to said hydraulic press.

11. The device of claim 2 wherein said control panel having a third button operatively attached to said electric motor.

12. A recycling device consisting essentially of:
- a housing unit having an interior chamber, a first collar defining a top orifice in said housing unit and a second collar defining a side orifice in said housing unit, wherein said top and side orifices are capable of allowing access into the interior chamber of said housing unit;
- a first door pivotally attached to said housing unit, said first door capable of covering a portion of the top orifice of said housing unit;
- a second door pivotally attached to said housing unit, said second door capable of covering a portion of the side orifice of said housing unit;
- an elongated barrel having a central axis, said barrel rotatably attached to said housing unit, said barrel disposed within the interior chamber of said housing unit, said barrel comprising:
  - an exterior casing;
  - a distal wall attached to said exterior casing;
  - a proximate wall attached to said exterior casing;
  - a center shaft attached to said distal wall and attached to said proximate wall, said center shaft disposed substantially along the central axis of said barrel, wherein said center shaft pivotally attached to said housing unit;
  - a first partition wall attached to said exterior casing of said barrel, wherein said barrel having a first receiving bin defined by said distal wall, said first partition wall, and said exterior casing; and
  - a second partition wall attached to said exterior casing of said barrel, wherein said barrel having a second receiving bin defined by said first partition wall, said second partition wall and said exterior casing, wherein said barrel having a third receiving bin defined by said second partition wall, said proximate wall, and said exterior casing;
- an electrical plug attached to said housing unit;
- a utility motor attached to said housing unit, said utility motor operatively attached to said electrical plug;
- a utility belt drive operatively attached to said utility motor;
- a rolling pin pivotally attached to said housing unit, said rolling pin operatively attached to said utility belt drive;
- a conveyor belt operatively attached to said rolling pin;
- a plurality of intake rollers pivotally attached to said housing unit, wherein said plurality of intake rollers operatively attached to said utility belt drive;
- a shredding blade attached to said housing unit, wherein said plurality of intake rollers and said shredding blade defining a paper shredder;
- a receiving bucket attached to said housing unit;
- a hydraulic press attached to said housing unit, said hydraulic press operatively attached to said electrical plug;
- a compression piston attached to said hydraulic press, a portion of said compression piston is slidably insertable within a portion of said receiving bucket;
- an electric motor attached to said housing unit, said electric motor operatively attached to said electrical plug;
- a control panel attached to said housing unit, said control panel is operatively connected to said utility motor, to said hydraulic press and to said electric motor, wherein said control panel having
  - a first button operatively attached to said utility motor;
  - a second button operatively attached to said hydraulic press; and
  - a third button operatively attached to said electric motor;
- a first pulley attached to said electric motor;
- a second pulley attached to said center shaft of said barrel;
- a flexible band operatively attached to said first pulley and to said second pulley;
- a first handle attached to said first door;
- a second handle attached to said second door;
- a first hinge attached to said housing unit and attached to said first door;
- a second hinge attached to said housing unit and attached to said first door;
- a third hinge attached to said housing unit and attached to said second door; and
- a fourth hinge attached to said housing unit and attached to said second door.

* * * * *